Sept. 2, 1952 H. R. KAISER 2,609,045

TIMER ATTACHMENT FOR TELEPHONES

Filed April 16, 1951 2 SHEETS—SHEET 1

Henry R. Kaiser
INVENTOR.

BY Clarence A. O'Brien and Harvey B. Jacobson
Attorneys

Sept. 2, 1952 H. R. KAISER 2,609,045

TIMER ATTACHMENT FOR TELEPHONES

Filed April 16, 1951 2 SHEETS—SHEET 2

Henry R. Kaiser
INVENTOR.

BY Clarence A. O'Brien
and Harvey B. Jacobson
Attorneys

Patented Sept. 2, 1952 2,609,045

UNITED STATES PATENT OFFICE 2,609,045

TIMER ATTACHMENT FOR TELEPHONES

Henry R. Kaiser, Pittsburgh, Pa.

Application April 16, 1951, Serial No. 221,297

5 Claims. (Cl. 161—19)

This invention relates to a novel attachment for a telephone in order to act as a reminder of the time being spent in using the telephone.

An object of this invention is to provide an improved timing attachment for a standard telephone, the timing attachment including a support provided with a standard clock mechanism and a means of causing the clock to be operative in response to removal of the hand-set from the cradle of the base of the telephone, together with a structural means of rewinding and resetting the clock mechanism in response to replacement of the telephone hand-set in its cradle.

A further object of this invention is to provide an attachment for a telephone which requires absolutely no alteration to the standard telephone base, hand set or any other part thereof in order to mount the device on the telephone and use the device thereafter.

Ancillary objects and features of importance will become apparent in following the description of the illustrated form of the invention.

The illustrated attachment for a standard telephone is a device which, when attached to a telephone instrument, presents to the user a visual indication of the time that has elapsed since the receiver was taken from its cradle. The purpose of the device is to permit the user of the telephone to appreciate the time that is being used on the telephone and permit the user to govern his actions on a telephone accordingly. This device, through its ability to develop telephone conversation time conscientiousness, will assist in bringing about more equitable use of telephone service, particularly during periods of congestion, and particularly in the case of a party line service.

Figures 1, 2, 3:
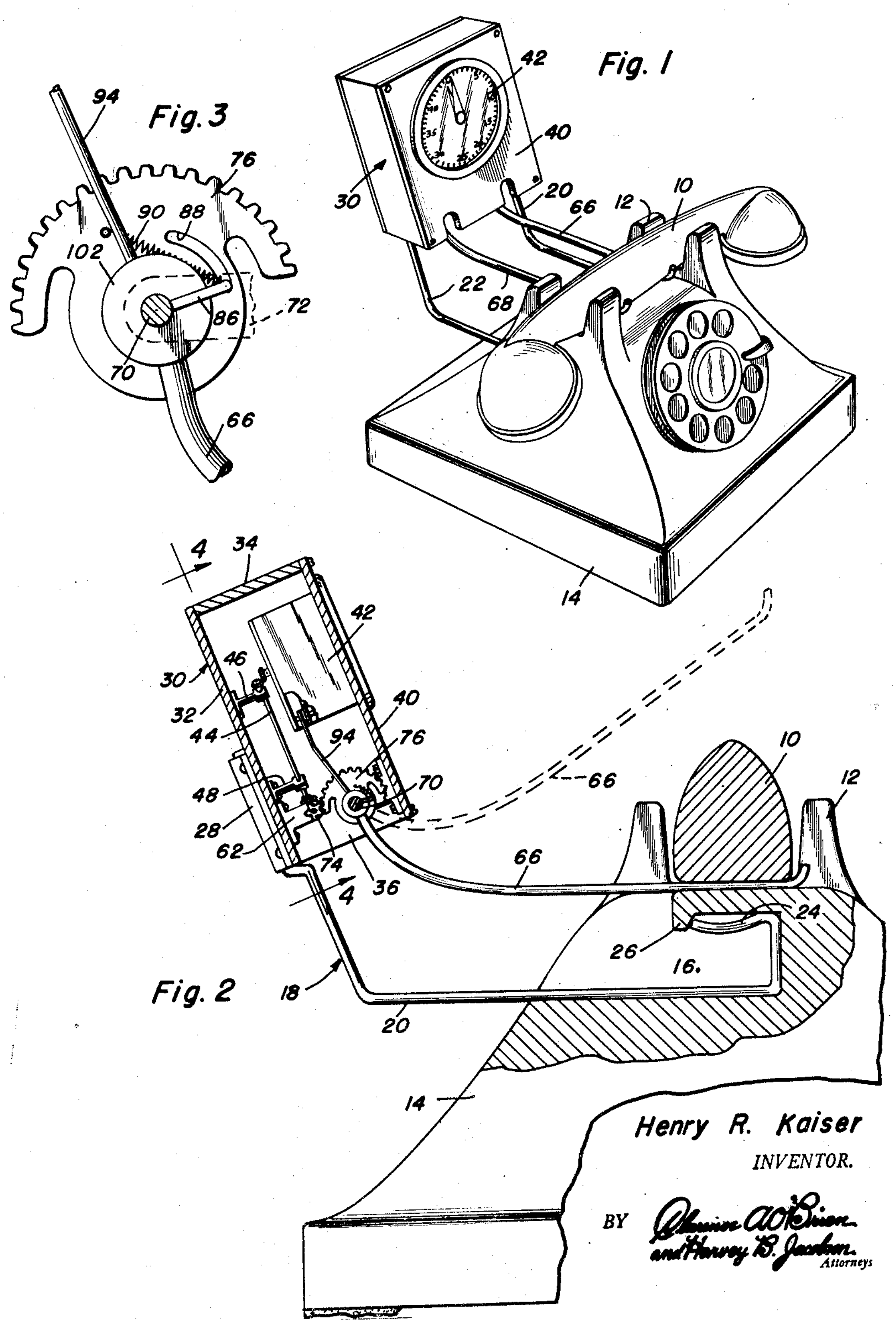
Figure 1 is a perspective view of the device showing it located on a standard telephone.
Figure 2 is a transverse sectional view of the device in Figure 1, portions of the telephone being shown fragmentarily and in elevation.
Figure 3 is an enlarged sectional view taken on the line 3—3 of Figure 4.

In Figures 1 and 2, there are standard telephone components including the hand-set 10 mounted in a cradle 12 of a standard base 14, the base having a recess 16 opening rearwardly thereof. A support 18 for the various operative elements of the attachment is connected to the telephone base by means of the two mounting brackets 20 and 22, the mounting brackets constituting a part of the support 18. The inner ends of the mounting brackets are provided with hooks 24 to engage the depending bead 26 of the base which is located in the recess 16, thereby holding the support 18 firmly but detachably fastened to the base 14. The opposite ends of the mounting brackets 20 and 22 are secured by the clamps 28 to the rear part of a housing 30. The housing includes a back wall or rear part 32, a top wall 34, sides 36 and 38, and a front panel 40. The front panel is provided with an opening in which the face of a standard clock 42 of the timer type is located. Any suitable means is employed for fastening the clock 42 to the front panel 40.

A shaft 44 is mounted rotatably in bearings at the ends of the brackets 46 and 48, these brackets being fixed to the inner surface of the back wall 32 of the housing 30. Gears 50 and 52 are fixed to the ends of the shaft 44 and are enmeshed respectively with the gears 56 and 58, the shaft 44 with its gearing constituting a means of drivingly connecting the clock 42 with a second shaft 60. This second shaft is carried by mounting brackets 62 which are fixed to the back wall of the housing 30 and the function of the shaft 60 is to support a resetting and rewinding pinion 64, the pinion being fixed to the shaft 60 for rotation therewith.

Figures 5, 6:
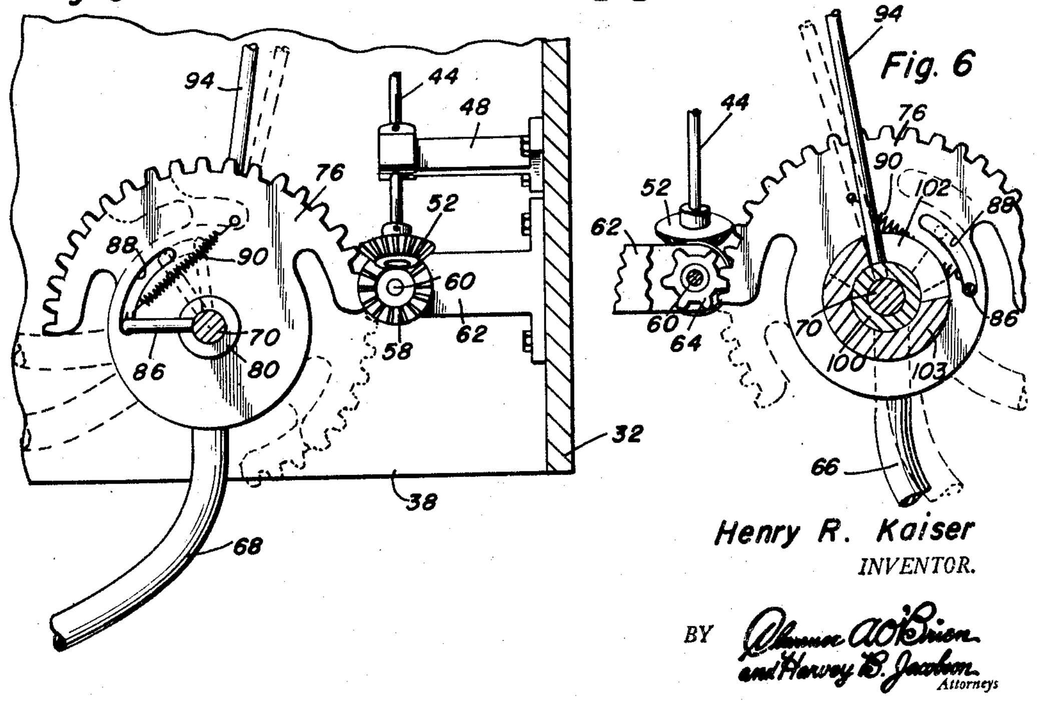
Figure 5 is an enlarged sectional view taken on the line 5—5 of Figure 4.
Figure 6 is an enlarged sectional view taken on the line 6—6 of Figure 4.

A pair of operating arms 66 and 68, respectively, are appropriately curved to fit through the open bottom of the casing or housing 30 and be located normally in the cradle 12 of the telephone base 14. The proper disposition of the arms 66 and 68 is illustrated in Figure 2, a second position of these arms being shown in dotted line. The inner ends of the arms 66 and 68 are fixed to a first shaft 70, this first shaft being either integrally joined to each arm or fixed thereto by a standard fastening means. The shaft 70, and hence the arms 66 and 68, are mounted for rotation within the housing 30 by means of brackets which have bearings 72 and 74 at their outer ends. The shaft 70 is parallel to the second shaft 60 and there is a means drivingly connecting the two shafts. This means is seen best in Figure 6 and includes a segmental gear 76 mounted for free rotation on the first shaft 70 and limited in its movement axially of the shaft 70 by the thrust bearings 80 and 82, these thrust bearings being preferably made by crimping the shaft 70 at two spaced places. The segmental gear 76 is enmeshed with the pinion 64 and therefore upon actuation of the second shaft 60, the first shaft 70 supported segmental gear 76 will rotate. The rotation would normally be freely on the shaft 70. However, there is a means drivingly connecting the shaft 70 with the segmental gear 76.

The last-mentioned means includes a driver element 86, preferably being a U-shaped dog fixed at its ends to the first shaft 70 and having its web portion located in a slot 88 formed in the gear 76. There is a spring 90 (Figure 5) fixed at one end to the driver element 86 and fixed at its opposite end to the gear 76. In view of the presence of the slot 88, when the operating arms 66 and 68 are rotated, thereby causing rotation of the shaft 70, the shaft 70 is permitted to travel through a considerable number of degrees of rotation. Then, the driver element 86 engages one end of the slot 88 and further movement of the segmental gear 76 is imparted to the shaft 70.

Figure 4:
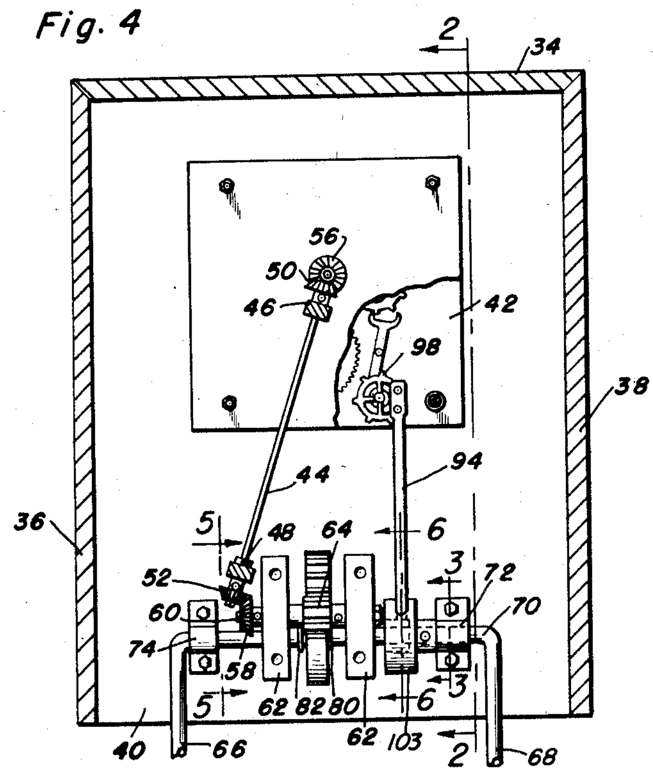
Figure 4 is a sectional view taken on the line 4—4 of Figure 2.
Figure 7:
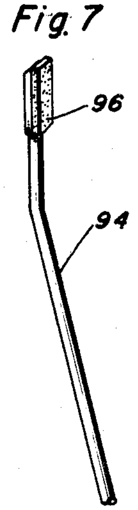
Figure 7 is a fragmentary perspective view of the brake arm and brakeshoe constituting a part of the structural adaptation of the invention.

Attention is now invited to Figure 4, where the brake arm 94 is illustrated. The upper end of the brake arm has a brakeshoe 96 thereon arranged to come into contact with an appropriate part of the clock 42, as the balance wheel 98, in order to stop the clock. The opposite end of the brake arm 94 has an eye 100 fixed thereto, this eye constituting a bearing which is freely rotatable on the shaft 70. A lost motion drive connection is operatively connected with the brake arm 94 and the first shaft 70. This lost motion drive connection comprises a collar 103 which is fitted, as by a set screw, to the first shaft 70 and the collar has a slot 102 opening through the side wall thereof. The slot 102 accommodates the lower end of the brake arm so that upon appropriate operation of the first shaft 70, the brake arm 94 is caused to be actuated.

In operation, it is assumed that the telephone with its attachment is arranged as disclosed in Figure 1. The user lifts the hand-set 10 from the cradle 12, as is expected in order to place a call or to receive a call. As soon as the hand-set 10 is lifted, the arms 60 and 68 are raised by the action of the spring 90. This happens in the following way: Since the arms 66 and 68 are fixed to the first shaft 70 and the shaft is rotatable freely in the bearings 72 and 74, there is nothing to prevent the arms 66 and 68 from moving when the hand-set 10 is elevated. It is to be noted from inspection of Figure 5 that the first shaft 70 has the driver element 86 fixed thereto and this driver element is operable freely within the confines of the slot 88. Since the spring 90 is fastened to the driver element 86 and to the segmental gear 76, and the segmental gear 76 is relatively fixed inasmuch as it is enmeshed with the pinion 64, the arms 66 and 68 will be lifted by the spring 90.

However, since the first shaft 70 is rotated in this fashion, the collar 103, which constitutes a part of a lost motion drive connection for the brake arm 94, is caused to rotate correspondingly. Inasmuch as the slot 102 in the collar has the lower end of the brake arm 94 located therein, rotation of the collar will cause one end of the slot 102 to contact the brake arm 94, causing it to rotate, inasmuch as it is carried freely on the first shaft 70, and this rotation is in such direction as to separate the brakeshoe 96 from the balance wheel 98 or other appropriate part of the clock 42.

Now, the attachment may be clock operated because the shaft 44, together with the remainder of the means of drivingly connecting the clock with the second shaft 60, is capable of operation. Since the pinion 64 is enmeshed with the teeth of the segmental gear 76, the segmental gear is rotated. However, because of the spring 90 urging the driver element 86 against the end of the slot 88, rotation of the segmental gear will cause further rotation of the first shaft 70 through the mechanical connection of the driver element 86 between the segmental gear 76 and the first shaft 70. Therefore, as the spring of the spring-operated type clock 42 unwinds, the segmental gear 76 will be rotated correspondingly.

After the user of the telephone has completed his conversation, the hand-set 10 is replaced on the cradle. However, in placing the hand-set in the cradle, it is rested upon the arms 66 and 68. The first movement of the arms is opposed yieldingly by the spring 90 inasmuch as the shaft 70 is rotated free of the segmental gear 76, the drive element 86 moving in the slot 88. Upon further movement of the hand-set downwardly in the cradle 12, the arms 66 and 68 are pressed downwardly, but the driver element 86 is in engagement with the opposite ends of the slot 88, thereby imparting rotation to the shaft 70, which, through the pinion and segmental gear 76, rewinds the spring of the clock 42 at the same time the hands are reset. Inasmuch as the collar 103 is fixed to the shaft 70, during the return movement of the first shaft 70, the slot 102 bears against the lower end of the brake arm 94, thereby causing the brake shoe 86 and the brake arm 94 to move in such direction and to such a position that the brake shoe contacts the balance wheel 98 of the clock in order to stop it.

At this time, the telephone and its attachment are again ready for another complete cycle of operation.

Having described the invention, what is claimed as new is:

1. In a telephone base and hand-set removably disposed in the cradle of the base, a timer attachment comprising a support having means for attachment to the base, a clock carried by said support, an arm adapted to have one end located in the cradle, a first shaft, means mounting said shaft for rotation on said support, the opposite end of said arm being fixed to said shaft, a second shaft rotatably disposed on said support, a brake arm for the clock freely rotatably disposed on said first shaft, a lost motion drive connection operatively connected with said brake arm and secured to said first shaft, said drive connection being arranged to move said brake arm to such position as to stop said clock, means drivingly connecting said clock with said second shaft, means for drivingly connecting said second shaft to said first shaft, the last-mentioned means including a gear provided with a slot, a driver element fixed to said first shaft and engaged with said slot, a spring secured to said driver element and said gear, said spring being arranged to rotate said second shaft upon removal of the hand-set from the cradle so that said brake arm is moved to a position of disengagement with regard to the clock.

2. In an attachment for a telephone which is adapted to be operated by placement and removal of the hand part of a telephone, a support, a clock carried by the support, an operating arm, a shaft mounted for rotation on said support and having said operating arm fixed thereto, a second shaft mounted rotatably on said support and drivingly connected with said clock, a brake arm associated with said first-mentioned shaft and arranged to control the operation of said clock, and means drivingly connecting said shafts including a driver element fixed to one shaft and mechanically connected with the other shaft by a lost motion connection.

3. The combination of claim 2 and the last-mentioned means also including a pair of enmeshed gears, one being fixed to one of the shafts and the other being fixed to the other of the shafts, and said lost motion connection including the arrangement of a slot in one of said gears with said driver element located therein.

4. The combination of claim 3 and a spring reacting on one of said gears and said driver element to move said driver element toward one end of said slot yieldingly, and said spring, driver element and slot being so arranged that said operating arm is normally elevated by said spring.

5. In combination with a telephone cradle and hand-set, an attachment which includes a support having an operating arm located normally in said cradle below said hand-set, a shaft carried by said support and having said arm fixed thereto, a clock carried by said support, a brake arm arranged to stop said clock, a lost motion connection between said brake arm and said shaft to move said brake arm to such position that it stops said clock, yielding means reacting on said shaft for operating said arm when said hand-set is removed from said cradle and to move said lost motion connection to such position as to separate said brake arm from the clock, means drivingly connecting said clock with said shaft, the last-mentioned means including a pair of enmeshed gears, one of which has a slot, and a driver element fixed to said shaft and located in said slot, the drive element also constituting a part of said yielding means and constituting a part of a rewinding and resetting means for the clock.

HENRY R. KAISER.

REFERENCES CITED

The following references are of record in the file of this patent:

UNITED STATES PATENTS

| Number | Name | Date |
|---|---|---|
| 2,302,260 | Rothwell | Nov. 17, 1942 |